(12) United States Patent
Chen et al.

(10) Patent No.: US 7,617,763 B2
(45) Date of Patent: Nov. 17, 2009

(54) MOTORIZED AND REMOTE-CONTROLLED CABINET DESIGN OF FILTER HOLDER FOR PRESSURIZED ESPRESSO MACHINES

(75) Inventors: Andrew Yuen Chin Chen, Hong Kong (HK); Sum Fat Poon, Hong Kong (HK)

(73) Assignee: Electrical & Electronics Limited, Hong Kong (HK)

( * ) Notice: Subject to any disclaimer, the term of this patent is extended or adjusted under 35 U.S.C. 154(b) by 666 days.

(21) Appl. No.: 11/325,806

(22) Filed: Jan. 5, 2006

(65) Prior Publication Data

US 2006/0137534 A1 Jun. 29, 2006

Related U.S. Application Data

(63) Continuation-in-part of application No. PCT/US2004/043422, filed on Dec. 23, 2004, which is a continuation-in-part of application No. 10/745,440, filed on Dec. 23, 2003, now Pat. No. 7,237,475.

(30) Foreign Application Priority Data

Dec. 23, 2003 (EP) .................................. 03029686

(51) Int. Cl.
*A47J 31/40* (2006.01)
*A47J 31/00* (2006.01)
(52) U.S. Cl. ...................... 99/302 R; 99/295; 99/289 R
(58) Field of Classification Search ............... 99/302 R, 99/289 R, 295
See application file for complete search history.

(56) References Cited

U.S. PATENT DOCUMENTS

| 1,750,068 A | 3/1930 | Torriani |
| 3,470,812 A | 10/1969 | Levinson |

(Continued)

FOREIGN PATENT DOCUMENTS

AU 2004203097 7/2004

(Continued)

OTHER PUBLICATIONS

U.S. Appl. No. 10/584,421, filed Jun. 23, 2006, Chen, et al.

(Continued)

*Primary Examiner*—Reginald L Alexander
(74) *Attorney, Agent, or Firm*—George A. Herbster

(57) ABSTRACT

This invention pertains to a brewing head assembly of a coffee machine that enables easy insertion and removal of the filter as well as locking of the filter and the filter holder into the brewing head to form a water-tight seal under pressure. The filter holder can be inserted into the brewing head assembly by sliding the filter holder into the brewing head assembly from the front, top, or side or by swinging the filter holder, which may be pivotally-attached to the brewing head assembly, into the coffee machine. The locking mechanism for inserting and securing the filter holder to the brewing head assembly may be motor-driven. Additionally, the motorized method for opening/closing and locking/unlocking the brewing head assembly may be operated by remote control. Furthermore, the boiler or heating system is may be maintained separately from the brewing head assembly.

15 Claims, 16 Drawing Sheets

U.S. PATENT DOCUMENTS

| | | |
|---|---|---|
| 4,254,694 A | 3/1981 | Illy |
| 4,429,623 A | 2/1984 | Illy |
| 4,741,260 A | 5/1988 | Bolivar |
| 4,882,982 A | 11/1989 | Muttoni |
| 5,103,716 A | 4/1992 | Mikkelsen |
| 5,111,740 A | 5/1992 | Klein |
| 5,197,374 A | 3/1993 | Fond |
| 5,388,502 A | 2/1995 | Hufnagl |
| 5,526,733 A | 6/1996 | Klawuhn |
| 5,531,152 A | 7/1996 | Gardosi |
| 5,622,099 A | 4/1997 | Frei |
| 5,638,741 A | 6/1997 | Cisaria |
| 5,649,472 A | 7/1997 | Pleisch et al. |
| 5,794,519 A | 8/1998 | Fischer |
| 5,913,962 A | 6/1999 | Gasser et al. |
| 5,921,168 A | 7/1999 | Nello |
| 5,992,298 A | 11/1999 | Illy et al. |
| 6,009,792 A | 1/2000 | Kraan |
| 6,021,705 A | 2/2000 | Dijs |
| 6,119,582 A | 9/2000 | Allerman-Theunisse |
| 6,161,469 A | 12/2000 | Rolla |
| 6,345,570 B1 | 2/2002 | Santi |
| 6,412,394 B2 | 7/2002 | Bonanno |
| 6,481,338 B1 | 11/2002 | Wai et al. |
| 6,490,966 B2 | 12/2002 | Mariller et al. |
| 6,510,783 B1 | 1/2003 | Basile et al. |
| 6,655,260 B2 | 12/2003 | Lazaris |
| 6,698,332 B2 | 3/2004 | Kollep et al. |
| 6,748,850 B1 | 6/2004 | Kraan |
| 6,799,503 B2 | 10/2004 | Kollep |
| 6,935,222 B2 | 8/2005 | Chen et al. |
| 7,237,475 B2 | 7/2007 | Chen et al. |
| 2002/0022070 A1 | 2/2002 | Dijs |
| 2002/0148356 A1 | 10/2002 | Lazaris et al. |

FOREIGN PATENT DOCUMENTS

| | | |
|---|---|---|
| AU | 2004308478 | 6/2006 |
| BR | PI0417942-0 | 6/2006 |
| CA | 2473188 | 7/2004 |
| CA | 2541851 | 5/2006 |
| CH | 337633 | 4/1959 |
| CN | 200480041525.4 | 8/2006 |
| CN | 200410063485.5 | 7/2007 |
| DE | 19647039 A | 7/1997 |
| DE | 10247573 A | 4/2004 |
| EP | 0555775 A1 | 8/1993 |
| EP | 0838185 A1 | 4/1998 |
| EP | 1016364 A2 | 12/1999 |
| EP | 1000574 | 5/2000 |
| EP | 1169956 | 1/2002 |
| EP | 1495703 A1 | 1/2005 |
| EP | 1547498 | 6/2005 |
| EP | 1703826 | 9/2006 |
| GB | 811979 | 4/1959 |
| HK | 05101497.1 | 2/2005 |
| HK | 05105612.2 | 7/2005 |
| HK | 07100546.2 | 1/2007 |
| JP | 2004-201605 | 7/2004 |
| JP | 2006-547403 | 6/2006 |
| KR | 10-2006-7014484 | 7/2006 |
| WO | WO/01/15582 | 3/2001 |
| WO | WO/02/19876 | 3/2002 |
| WO | WO 02/091889 A2 | 11/2002 |
| WO | WO 03/055366 A2 | 7/2003 |
| WO | WO/2004/028318 | 4/2004 |
| WO | WO/2005/063092 | 7/2005 |

OTHER PUBLICATIONS

U.S. Appl. No. 11/105,073, filed Apr. 13, 2005, Chen, et al.

Figure 6
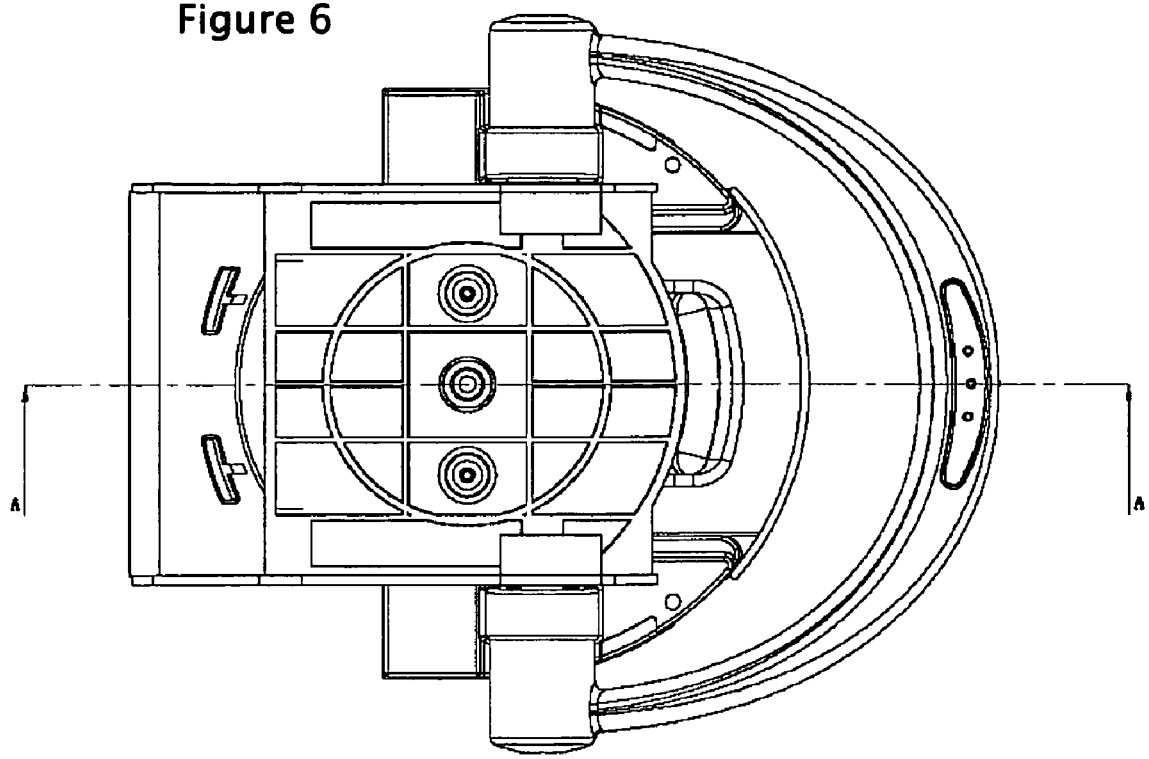
Figure 6A
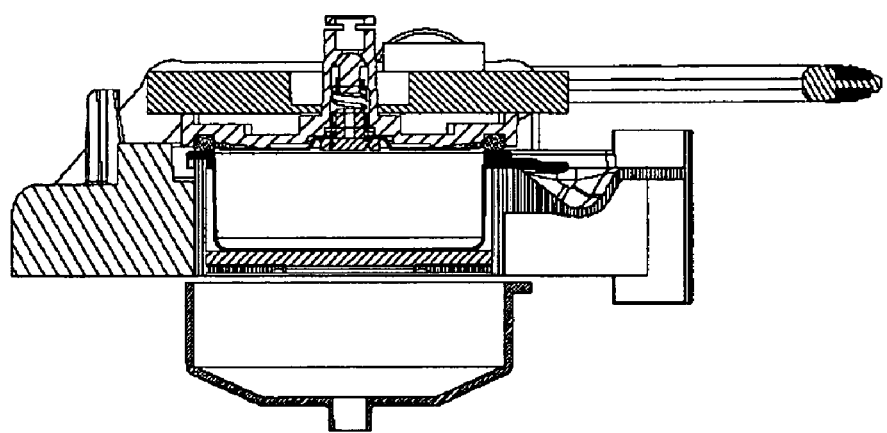
SECTION A-A
Figure 6B

Figure 7
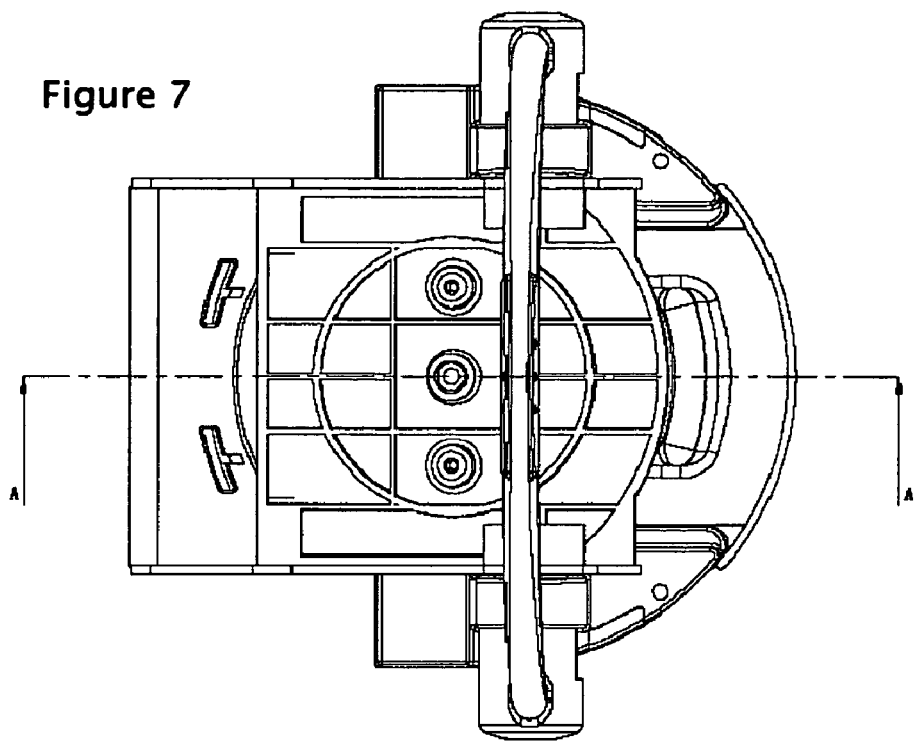
Figure 7A
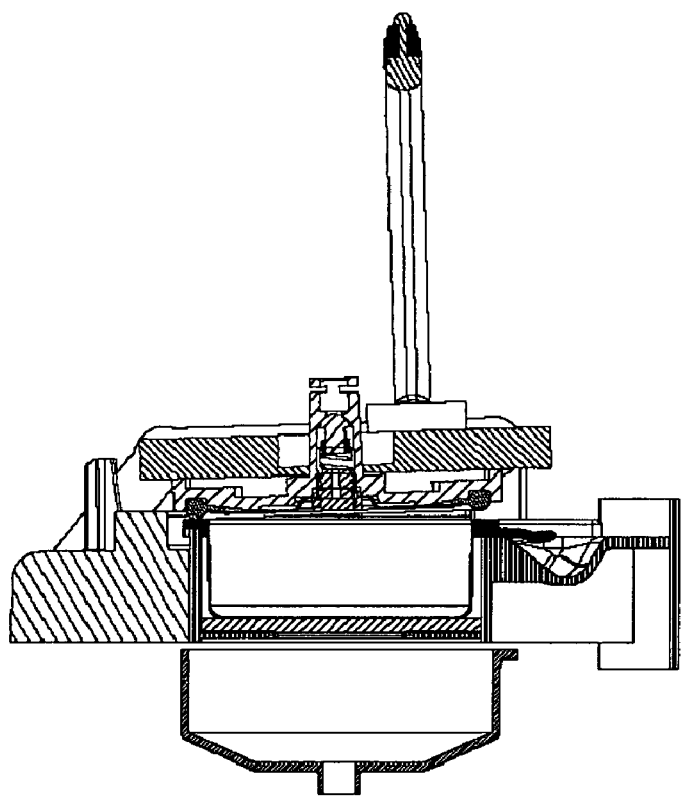
Figure 7B

Figure 11
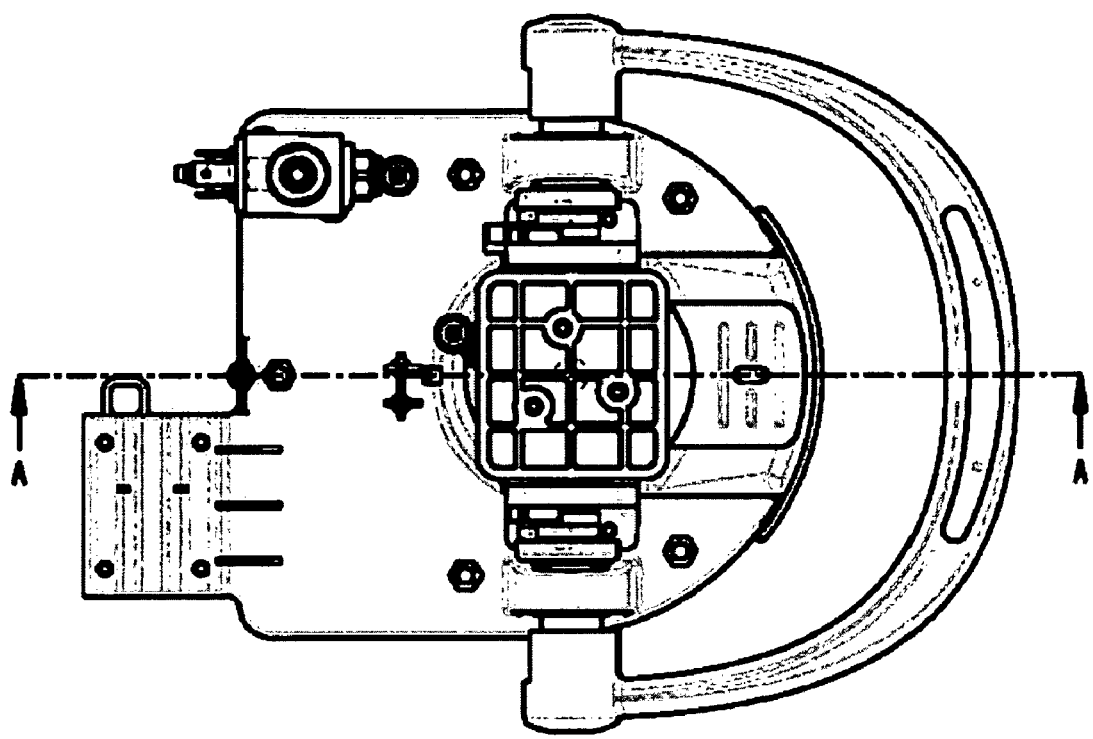
Figure 11A
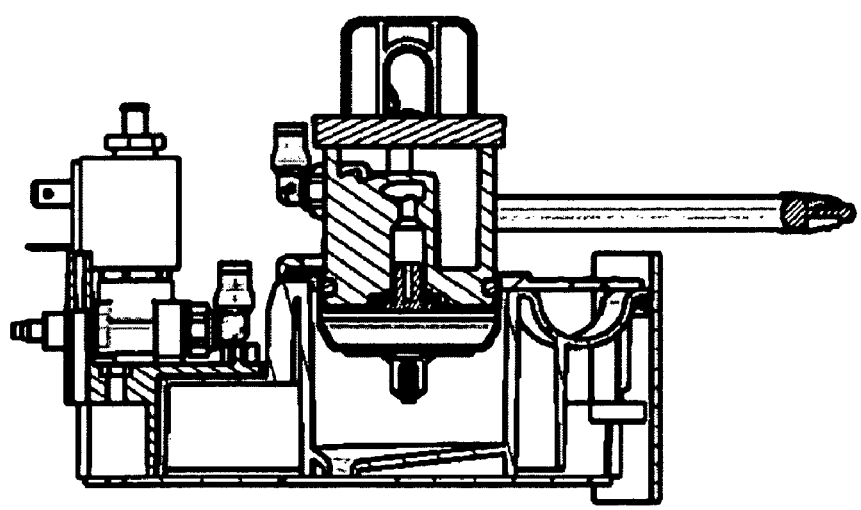
Figure 11B

Figure 12
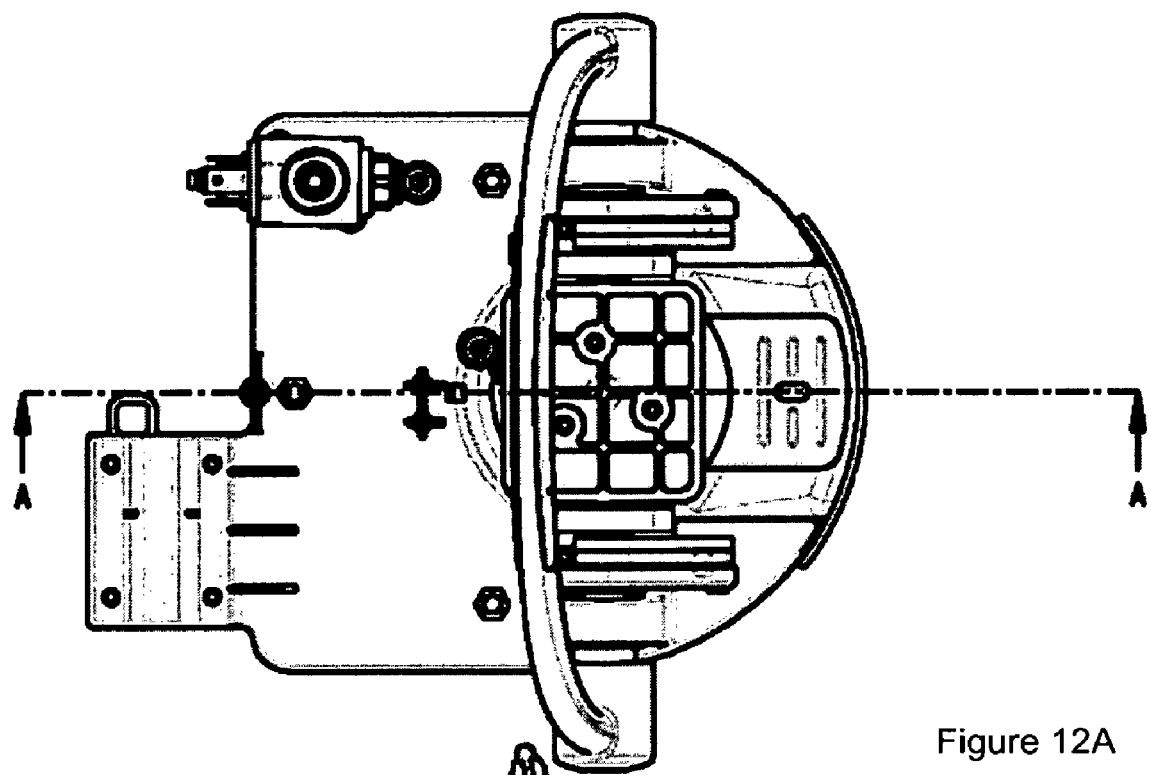
Figure 12A
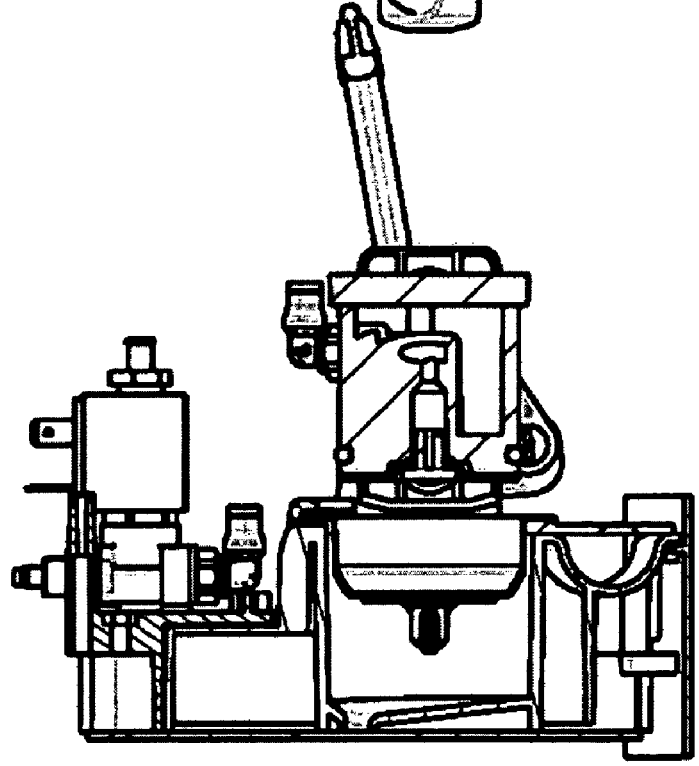
Figure 12B

Figure 16
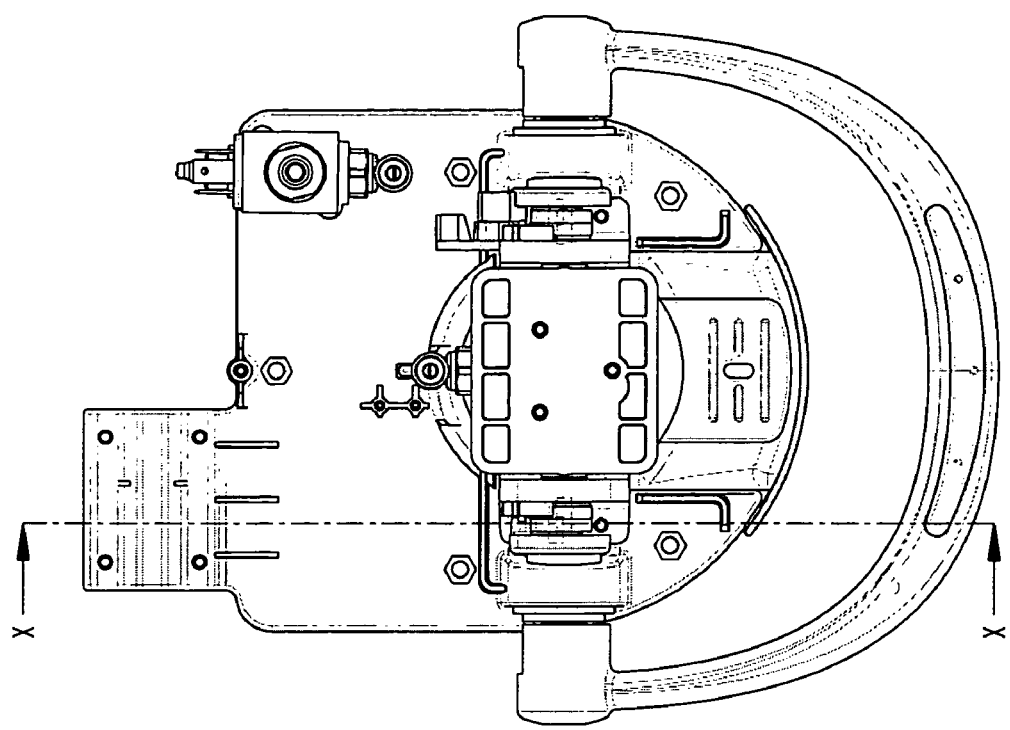
Figure 16A
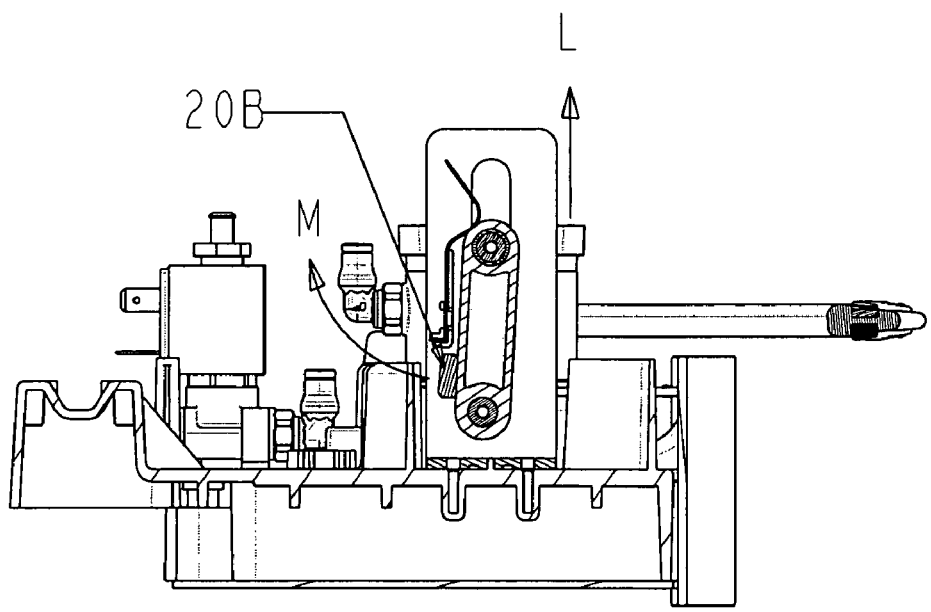
SECTION X-X
Figure 16B ization and simpler mechanism for locking the filter holder, whereby
MOTORIZED AND REMOTE-CONTROLLED CABINET DESIGN OF FILTER HOLDER FOR PRESSURIZED ESPRESSO MACHINES The present application is a continuation-in-part of International Application No. PCT/US2004/043422, filed Dec. 23, 2004, which is a continuation-in-part of U.S. Ser. No. 10/745,440, filed Dec. 23, 2003 now U.S. Pat. No. 7,237,475, and which also claims priority of European Patent Application No. 03029686.7, filed Dec. 23, 2003, the contents of which are incorporated herein in their entireties by reference into this application.

Throughout this application, various publications are referenced. The disclosures of these publications in their entireties are hereby incorporated by reference into this application to more fully describe the state of the art to which this invention pertains.

BACKGROUND OF THE INVENTION

The present invention relates to the design of a brewing head unit/assembly of a coffee machine comprising locking means for detachable attachment of a cabinet- or drawer-like filter holder to the brewing head unit of the coffee machine.

The locking mechanisms employed or used by most existing pump espresso or steam espresso machines are not very user friendly. With many existing machines, it can be very cumbersome for the user to locate and attach the filter holder unit onto the locking mechanism of the brewing head unit/assembly of a coffee machine. Generally, the filter holder units for espresso machines have a brewing tray, having a radially-projecting handle, which is inserted into a pot-shaped filter insert. For example, see U.S. Pat. No. 5,913,962. With such a design, the user initially would need to put the coffee ground into the stainless steel filter and then place or insert the filter into the filter holder. Next, the user would need to find the fitting slot(s) on the brewing head unit, attach the filter unit to the brewing head unit, and turn the filter unit to lock the filter unit onto the brewing head unit. As a result, the user frequently has to spend more time than necessary to locate the locking position on the brewing head unit.

Moreover, a traditional pump espresso or steam espresso machine uses either a boiler or a thermal block heating system which is mounted on top of the brewing head or shower and locking mechanism. With this design, the hot water from the heating system would flow directly to the filter.

There are drawbacks to mounting the boiler or the thermal block heating system on or above the brewing head unit, including:
1. The weight of the heating system on top of the brewing head unit will increase the force required to open the brewing head, rendering it less user-friendly.
2. When the heating system is fixed on top of the brewing head unit, it creates a constraint on the design of the locking mechanism.

In contrast, the present invention relates to a user-friendly and simpler mechanism for locking the filter holder, whereby the mechanism comprises a pivotable upper brewing head section and a lower brewing head section fixedly attached to the brewing head assembly. The lower brewing head section comprises a housing which can be adapted to receive various types filter holders and/or capsules. In one embodiment, the filter holder (movable part) is placed on the bottom of or is separated from the brewing head assembly. The movable part of the locking assembly is located on the top and the fixed part is located on the bottom, so the user can slide or swing the filter holder unit into the brewing head unit.

In another embodiment, the brewing head unit has a cabinet filter holder and boiler or heating system which is not placed on top of the brewing head unit, but rather is separated from the brewing head unit. For instance, the boiler or the heating system may be placed side-by-side with the brewing head locking mechanism. The boiler and brew head of the invention are operatively connected by Teflon or other suitable hose. The primary advantage of having a boiler or heating system which is separate from the brewing heat unit is that the brew head unit does not have to carry the weight of the boiler, thus enabling the design of the locking mechanism to be more flexible, versatile, and/or dynamic.

Essegielle S. r. l, et al., European Patent Application No. 97118294.4, Filed Oct. 21, 1997 relates to a device wherein the coffee pan is attached to a boiler located above the coffee pan by inserting the coffee pan along a sliding guide and rotating the coffee pan. However, the Essegielle, et al. device still requires the boiler to be placed on top of the brew head. Essegielle, et al discloses a two-step process for placing or inserting and locking the coffee pan. Essegielle, et al further discloses a coffee pan which slides into the annular body and a handle which is turned with the annular body to lock the coffee pan to the boiler. The present invention only requires the detachable cabinet filter holder to be placed in the coffee machine. A handle is rotated downward to lock the brewing head to form a water- and pressure-tight seal. Moreover, in the present invention, the boiler is not placed on the top of the brew head.

It is another object of the present invention to eliminate the main hassles of inserting the filter holder into the brewing head unit. The present invention relates to a new design which uses an easy-to-fit cabinet design as the filter holder. The user simply has to place the filter into the filter holder since there is no longer any need for the user to search blindly for the locking position. This cabinet design concept can be applied to all types of pressurized espresso machines. There are at least 5 ways to place the cabinets into the machines and can be performed as follows:

1. Slide the cabinet filter holder into the brewing head unit from the front;
2. Slide the cabinet filter holder into the brewing head unit from the sides;
3. Slide the cabinet filter holder into the brewing head unit from the rear;
4. Swing the cabinet filter holder in or out about a pivot fixed to the brewing head unit; or
5. Insert the cabinet filter holder into the brewing head unit from the top.

In one embodiment of the present invention, a motor is used to operate the locking mechanism and/or the cabinet filter holder without any manual intervention so that the entire movement of the cabinet filter holder unit or the locking or the opening of the brewing head assembly or unit would require less effort and, thus, be more convenient for the user. In an additional embodiment, the movement of the cabinet and/or the locking mechanism is effectuated by a motor which is operated by a remote control.

Table 1 below summarizes the key differences between the filter holder mechanism according to the existing state of the art and the cabinet filter holder of the present invention.

TABLE 1

DIFFERENCES BETWEEN THE FILTER HOLDER MECHANISM ACCORDING TO THE EXISTING STATE OF THE ART AND THE CABINET FILTER HOLDER OF THE PRESENT INVENTION

|  | Existing Pressurized Filter Holder Mechanism | Cabinet Filter Holder Mechanism Of The Present Invention |
| --- | --- | --- |
| Boiler or thermal block | It needs to be on top of the brew head and above the filter holder. | The boiler or thermal block does not have to be on the top of the brew head. It can even be separated from the brewing head assembly or unit or placed side by side with the locking mechanism. |
| Filter holder fitting | The user would need to fumble to locate it and then would need to lock the holder in place by turning it from left to right or right to left. | The new cabinet can be slid in from the front, side, or rear, or swung out, or inserted from the top. The movement of the cabinet can be automated by a motor to drive/control the movement. The motor can be operated by remote control. |
| Where to place the filter holder | Involves fumbling by the user. | Direct/immediately visible |
| Locking method | Lock by swing fit of the filter holder. | Rotate to Lock system |

Fond, et al., U.S. Pat. No. 5,649,472, relates to a system for extracting a substance contained in a sachet, which includes a lower member containing the sachet housing, a water supply member, and a locking lever. The lower member and the water supply member are closed or locked by engaging the hooks on the arm of the locking lever on the corresponding rods. The main purpose of the Fond, et al. is to provide a method and device for extracting substances for the preparation of a beverage contained in a sealing flexible sachet without opening the sachet before placing it in the sachet holder. The present invention can use or brew coffee grounds contained within a sachet or coffee grounds without a sachet having a pre-determined shape. The lower member of the Fond et al device is fixed, whereas the present invention has an upper member, i.e., rotate to lock assembly, which can move upward to allow a lower member, i.e., the filter holder assembly to be retrieved.

Mariller, et al., U.S. Pat. No. 6,490,966, relates to a device for extracting the contents in a capsule consisting of two independent and identical clamping elements, where each clamping element contains half of a housing for the capsule, and a lever system for moving both clamping simultaneous between open and closed positions. The Mariller device places a capsule in vertical position, therefore requiring the clamping members to produce greater clamp force to form a water-tight seal. In contrast, the brewing head of the present invention can use a coffee pod or capsule placed in the horizontal position. The brewing head of the present invention does not require two clamping members. To form a pressure- and water-tight seal, a movable upper member is lowered against the detachable stationery filter holder assembly.

Kollep, et al., U.S. Pat. No. 6,698,332, relates to a device for extracting a substance for the preparation of a drink, which includes a fixed piece and a second piece movable relative to the first piece about an axis of rotation lying at the rear to two pieces. The front-end of the two pieces contain a cavity for the substance to be extracted, and the device also includes a system for opening and closing the two pieces. However, the lower part of the Kollep, et al. device is fixed and cannot be removed for cleaning.

Domel SA/AG, et al., European Patent Application No. 93101764, filed Feb. 5, 1993, relates to a drawer device containing a container/filter holder. The container/filter holder can be raised upward with a handle in a non-rotating fashion against a facing gasket fixed above the drawer device to form a water-tight seal. The drawer in Domel, et al. is locked by rotating the control body. The movement of the container-filter holder is vertical, but the vertical movement requires the rotation of the control body. In contrast, the brewing head of the present invention only moves the upper member, i.e., the rotate to lock assembly. The lower member, i.e., the support base, of the brewing head of the present invention is fixed, but the filter holder assembly containing the filter can be removed completely for cleaning. Furthermore, the Domel, et al. device is only designed for coffee bags. The present invention is designed to use both ground coffee and coffee bags.

Torriani, U.S. Pat. No. 1,750,068, relates to a device containing a circular filter-carrier adapted to slide in and out of a window. The filter-carrier is locked by rotating a collector below the filter-carrier to force the filter-carrier upward against the upper portion of the brew head. The device in the Torriani patent has the design of a traditional espresso machine. The filter carrier can slide in and out, but to lock the filter carrier still requires blindly turning the thread on the collector.

Hatz, U.S. Pat. No. 811,979, relates to a device for preparing coffee, which includes a pressure cooker for forcing heated water to the coffee percolator by stream pressure. The Hatz device uses a different method to prepare the coffee. Hatz uses a pressure cooker instead of a boiler system. Hatz also uses a preculator instead of the filter holder. The pressure cooker requires a stove or heating device to heat up the water. The coffee machine of the present invention uses electricity to bring the water to boil.

The foregoing objects and advantages of the present invention are illustrative of that which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations, and improvements herein shown and described.

BRIEF SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

The present invention pertains-to the design and use of a cabinet filter holder for the brewing head assembly or unit of a coffee machine. The brewing head assembly comprises a boiler or heating system, which may be maintained separately from the brewing head assembly or unit. The brewing head assembly further comprises a filter holder assembly or unit which can be inserted into the brewing head assembly or unit by sliding the filter holder unit or assembly from the front or side, swing the filter holder assembly or unit in or out of the brewing head unit on a pivot, and inserting the filter holder assembly or unit vertically from the top.

The design of the mechanism for locking the filter holder assembly/unit in the brewing head assembly is capable of sustaining, advantageously, at least 5 bars of pressure. In another embodiment, the locking mechanism is capable of sustaining, advantageously, at least 10 bars of pressure. In an additional embodiment, the locking mechanism is capable of sustaining, advantageously, at least 15 bars of pressure is disclosed. In a further embodiment, the locking mechanism is capable of sustaining, advantageously, up to 20 bars of pressure.

In yet another embodiment, the locking mechanism of the invention is motor-driven and may be further operated by the use of remote control.

Although the present invention has been described in detail with particular reference to preferred embodiments thereof, it should be understood that the invention is capable of other different embodiments, and its details are capable of modifications in various obvious aspects. As is readily apparent to those skilled in the art, variations and modifications can be affected while remaining within the spirit and scope of the invention. Accordingly, the foregoing disclosure, description, and figures are for illustrative purpose only, and do not in any way limit the invention which is defined only by the claims.

BRIEF DESCRIPTION OF THE SEVERAL VIEWS OF THE DRAWING(S)

The accompanying drawings illustrate diagrammatically the non-limitative embodiments of the invention as follows:

One embodiment of the present invention, hereinafter referred to as Construction I, is shown in FIG. 1 to FIG. 5.

FIG. 1 is a cross-sectional illustration of the brewing head assembly/unit of Construction I in the locked/closed position. FIG. 1A: Top view. FIG. 1B: Side view.

Another embodiment of the present invention, hereinafter referred to as Construction II, is shown in FIG. 6 to FIG. 10.

FIG. 6 is a cross-sectional illustration of the brewing head assembly/unit of Construction II in the locked position. FIG. 6A: Top view. FIG. 6B: Side view.

FIG. 7 is a cross-sectional illustration of the brewing head assembly/unit of Construction II in the unlocked position. FIG. 7A: Top view. FIG. 7B: Side view.

Figure 8:
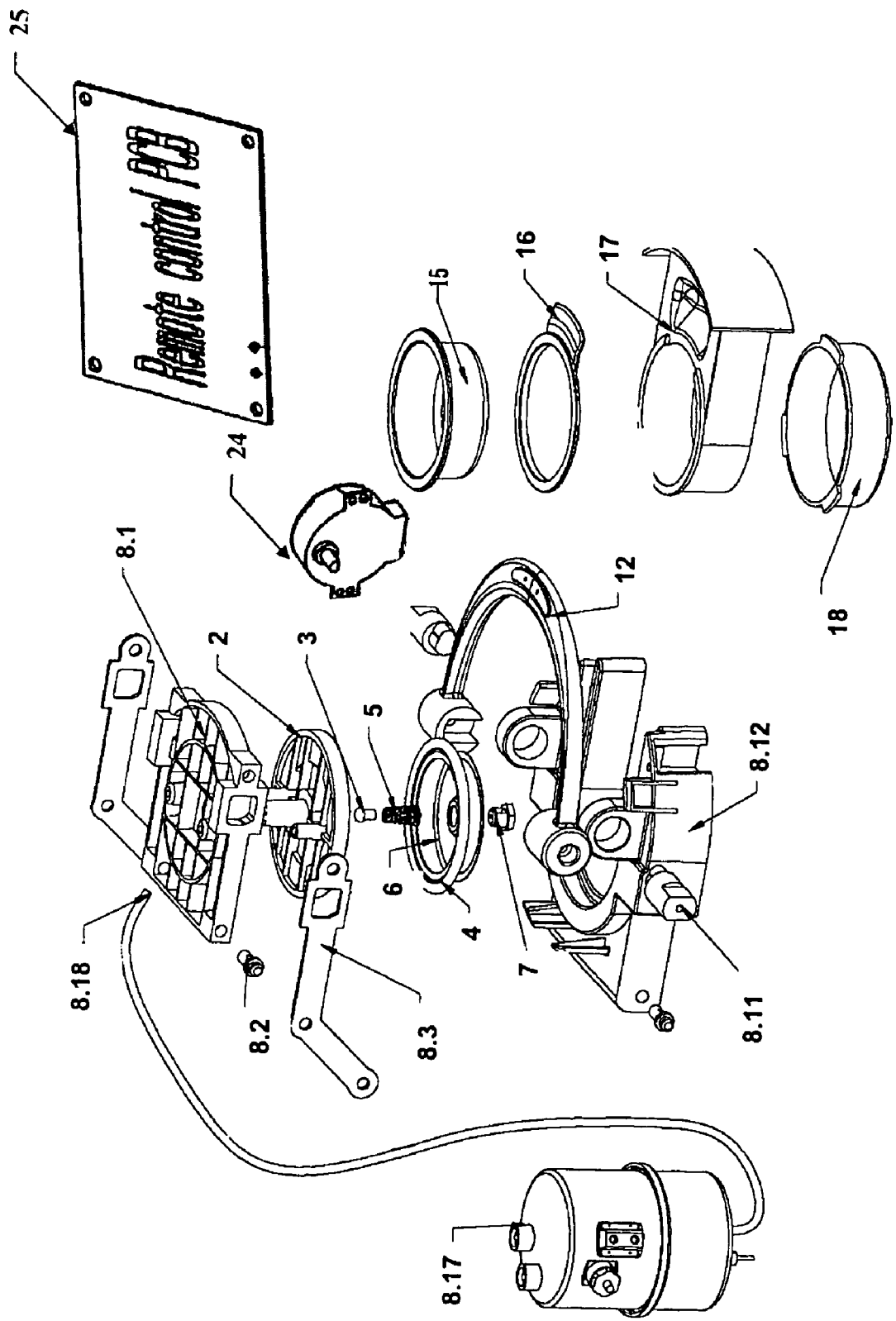

FIG. 8 is an exploded view of the brewing head assembly/unit of Construction II, comprising a rotate-to-lock assembly, motor, remote control PCB, a sealing assembly, a slide filter holder assembly, a separate boiler and hose for delivering pressurized and/or heated water/steam from the boiler to the coffee chamber.

Figure 9:
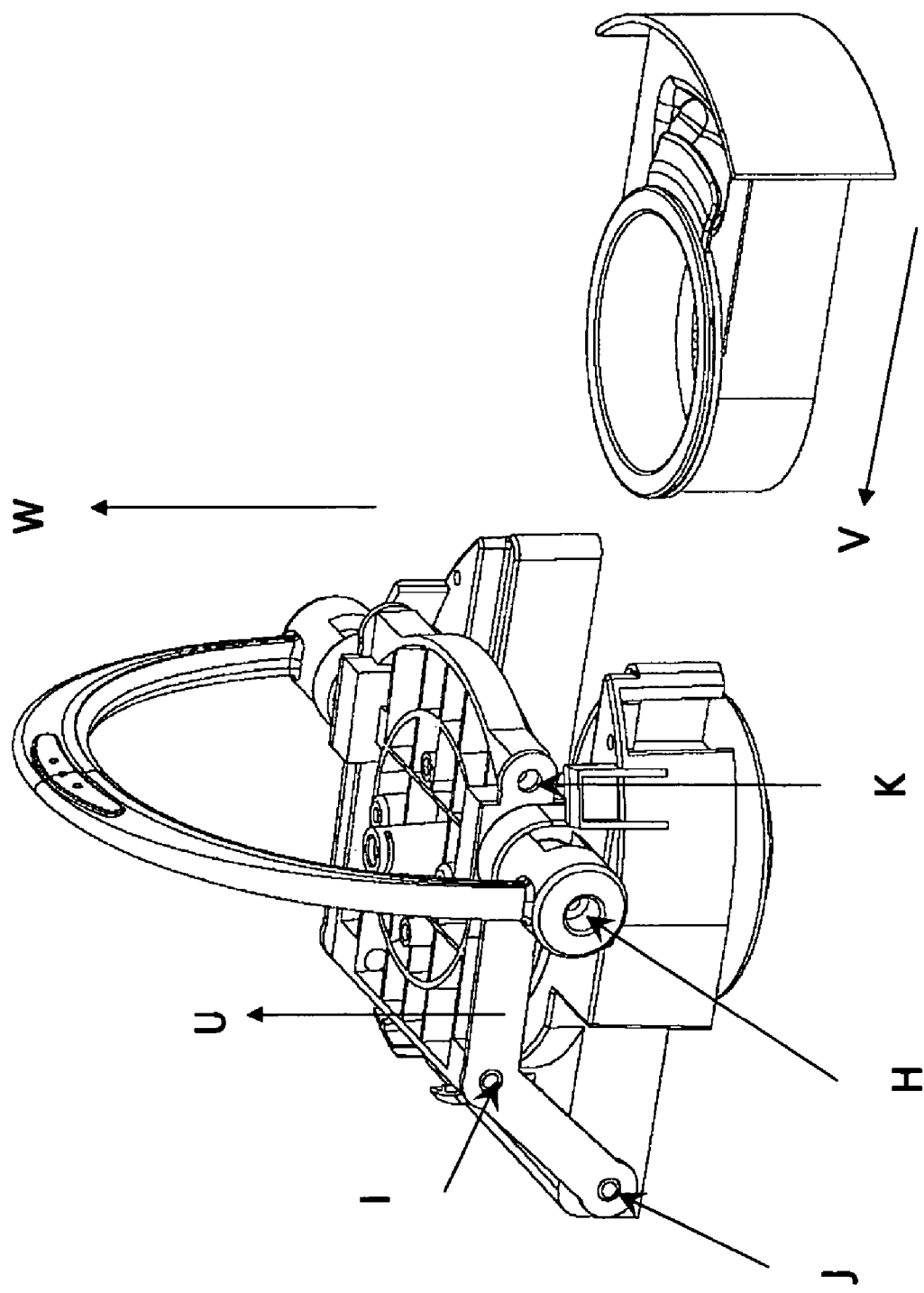

FIG. 9 is an isometric view of the brewing head assembly/unit of Construction II in the unlocked position.

Figure 10:
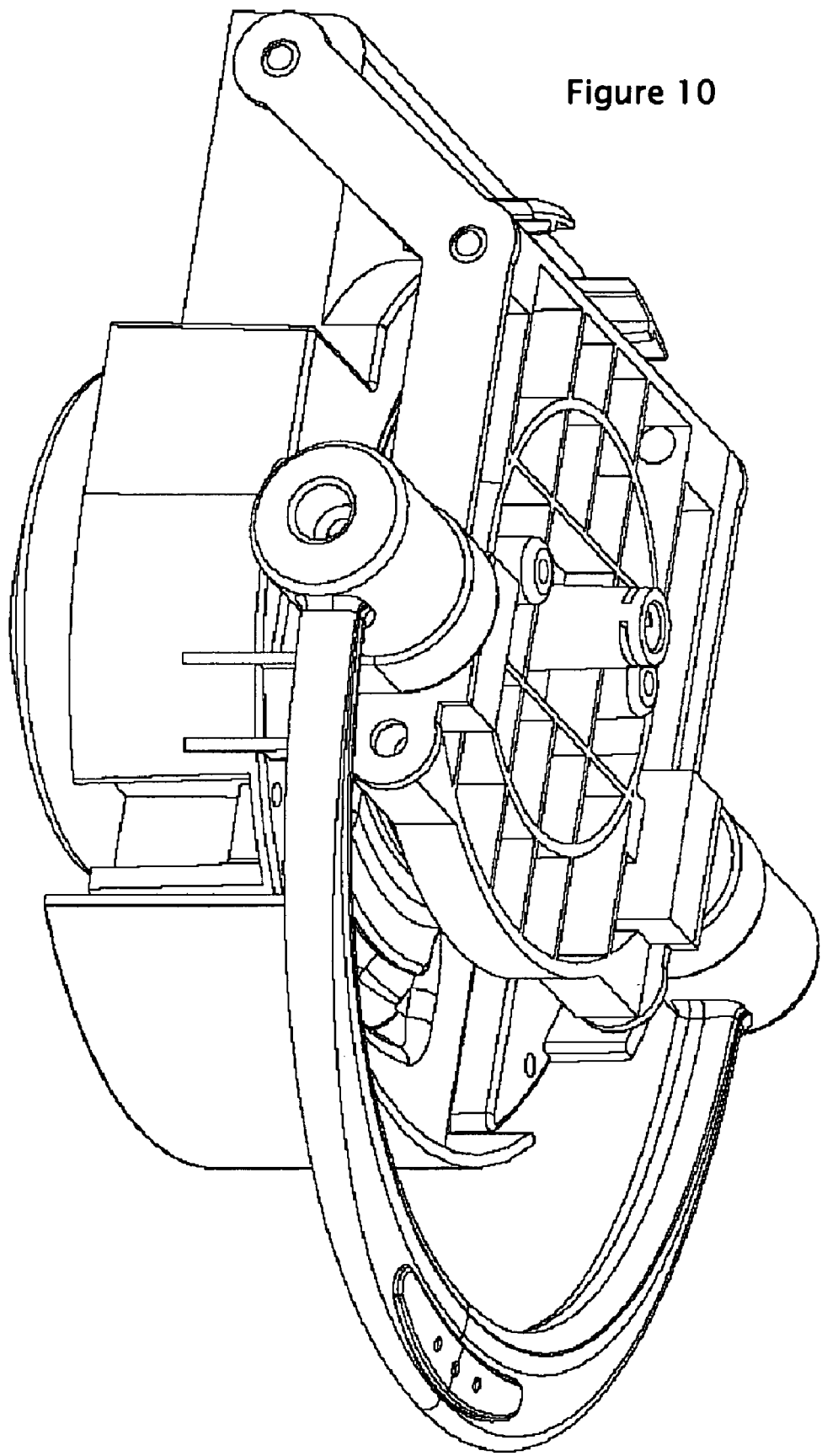

FIG. 10 is an isometric view of the brewing head assembly/unit of Construction II in the locked position.

Another embodiment of the present invention, hereinafter referred to as Construction III, is shown in FIG. 11 to FIG. 16.

FIG. 11 is a cross-sectional illustration of the brewing head assembly/unit of construction III in the locked position. FIG. 11A: Top View. FIG. 11B: Side View.

FIG. 12 is a cross-sectional illustration of the brewing head assembly/unit of construction III in the unlocked position. FIG. 12A: Top View. FIG. 12B: Side View.

Figure 13:
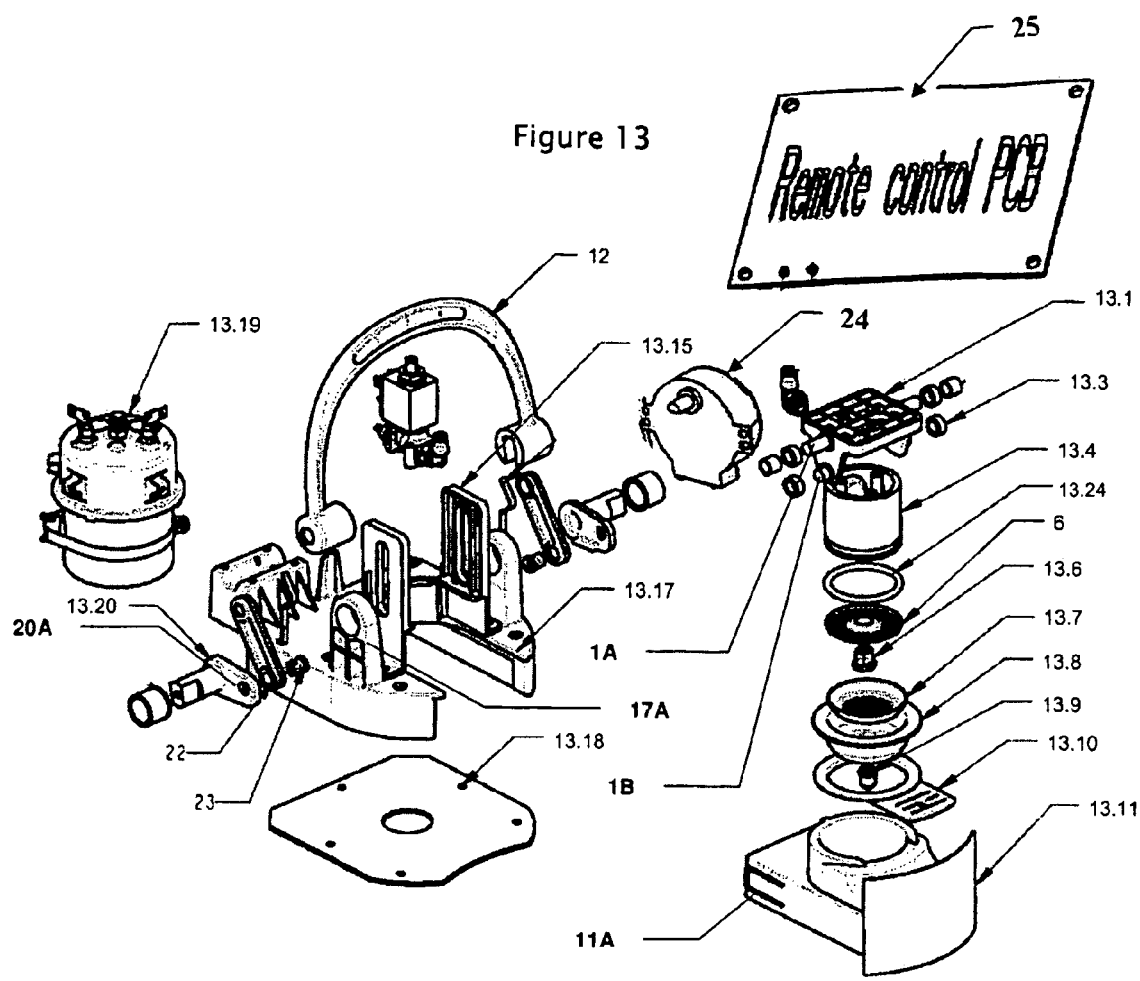

FIG. 13 is an exploded view of the brewing head assembly/unit of construction III, comprising a rotate-to-lock assembly, motor, remote control PCB, a sealing assembly, a slide filter holder assembly, a separate boiler and hose for delivering pressurized and/or heater water/steam from the boiler to the coffee chamber.

Figure 14:
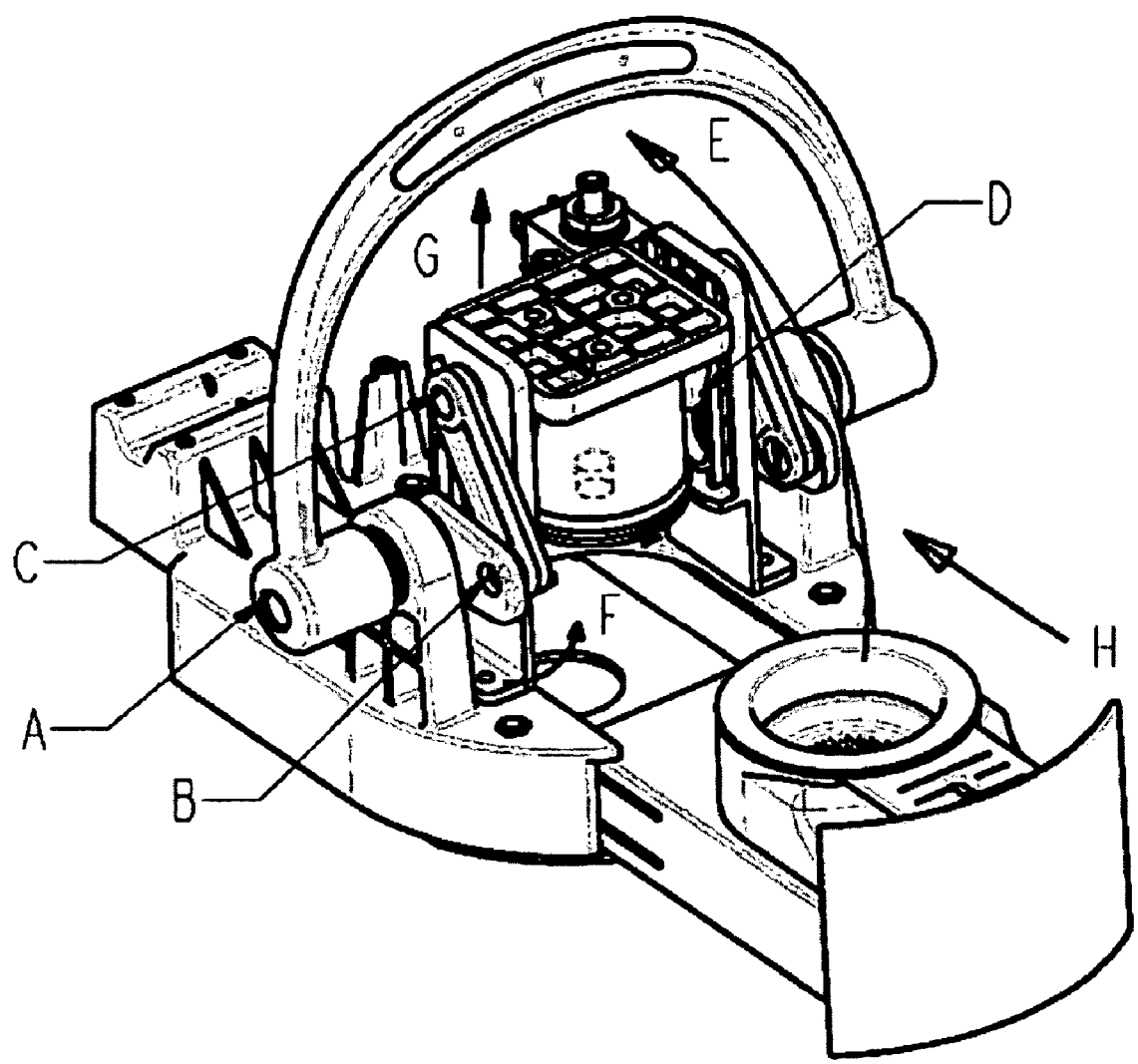

FIG. 14 is an isometric view of the brewing head assembly/unit of construction III in an unlocked position showing the filter holder slide into the brewing head assembly/unit of construction.

Figure 15:
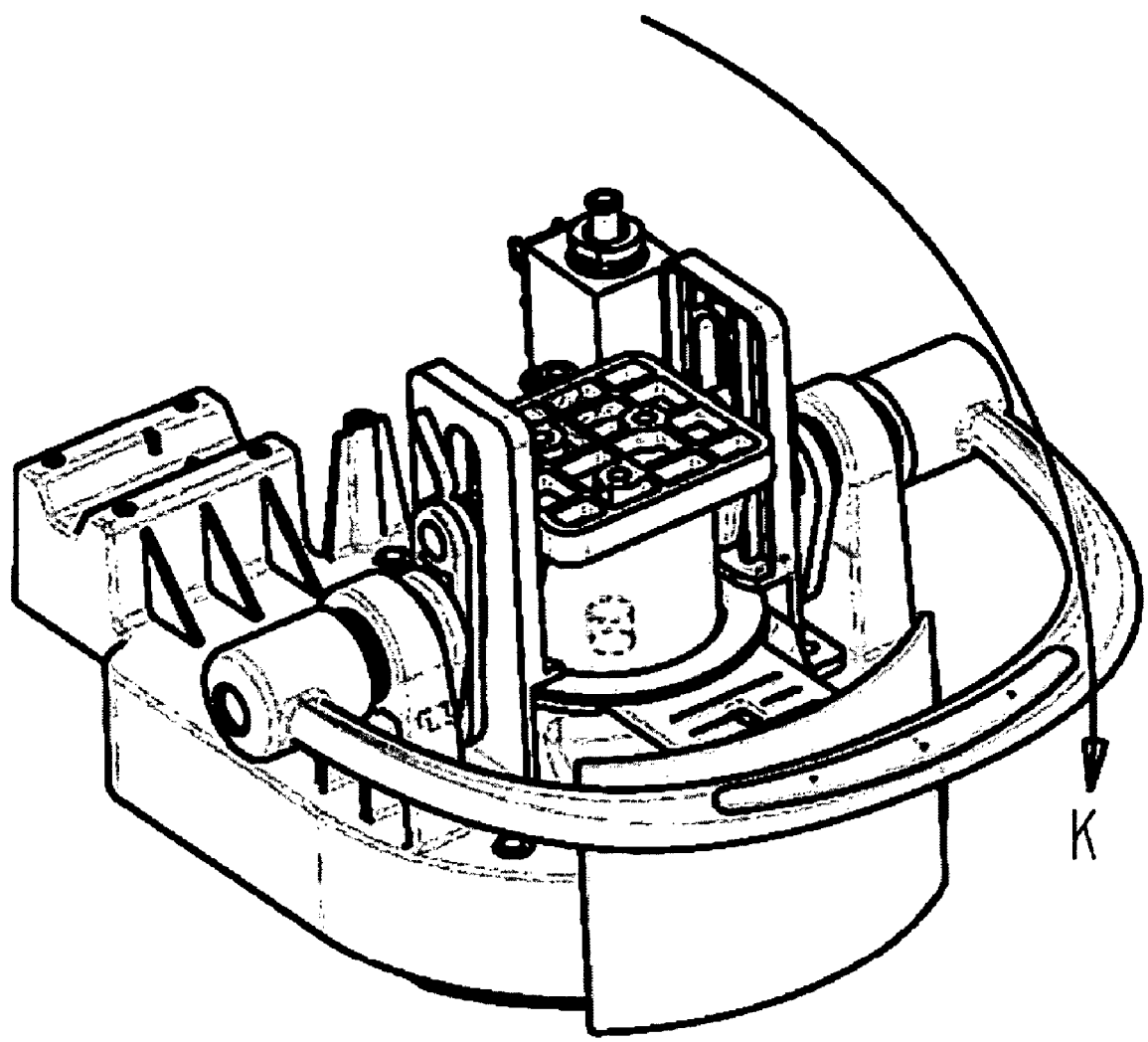

FIG. 15 is an isometric view of the brewing head assembly/unit of construction III in the locked position.

FIG. 16 is a cross-sectional illustration of the brewing head assembly/unit of construction III in the locked position. The section view shows the stopper on the rotation pole to keep the moving rod stopped on the inter lock position. FIG. 16A: Top View. FIG. 16B: Side View.

DETAILED DESCRIPTION OF THE INVENTION

It is an object of the present invention to provide a cabinet design of the filter holder. The present invention also provides a boiler or heating system which is separate from the brewing head unit of the coffee machine as well as a locking mechanism.

The locking mechanism of the present invention is advantageous over the prior art in that the filter holder unit does not need to be turned when the locking action is desired. The user needs to only slide in the filter holder and rotate the handle downward. Accordingly, the present invention is easier to operate and more efficient than the traditional turning-lock mechanism.

I. Rotate-to-Lock Assembly of Construction I

This embodiment of the present invention provides a brewing head assembly or unit (See FIGS. 1-5) of a coffee maker comprising: a rotate-to-lock assembly, a sealing assembly, and a filter holder assembly/unit, operatively-linked to sustain pressures of at least 5 bars. In another embodiment, the above-described rotate-to-lock assembly, sealing assembly, and filter holder assembly/unit are operatively-linked to sustain pressures of at least 10 bars. In an additional embodiment, the above-described rotate-to-lock assembly, sealing assembly, and filter holder assembly/unit are operatively-linked to sustain pressures of at least 15 bars. In a further embodiment, the above-described rotate-to-lock assembly, sealing assembly, and filter holder assembly/unit are operatively-linked to sustain pressures up to 20 bars.

Figure 1A:
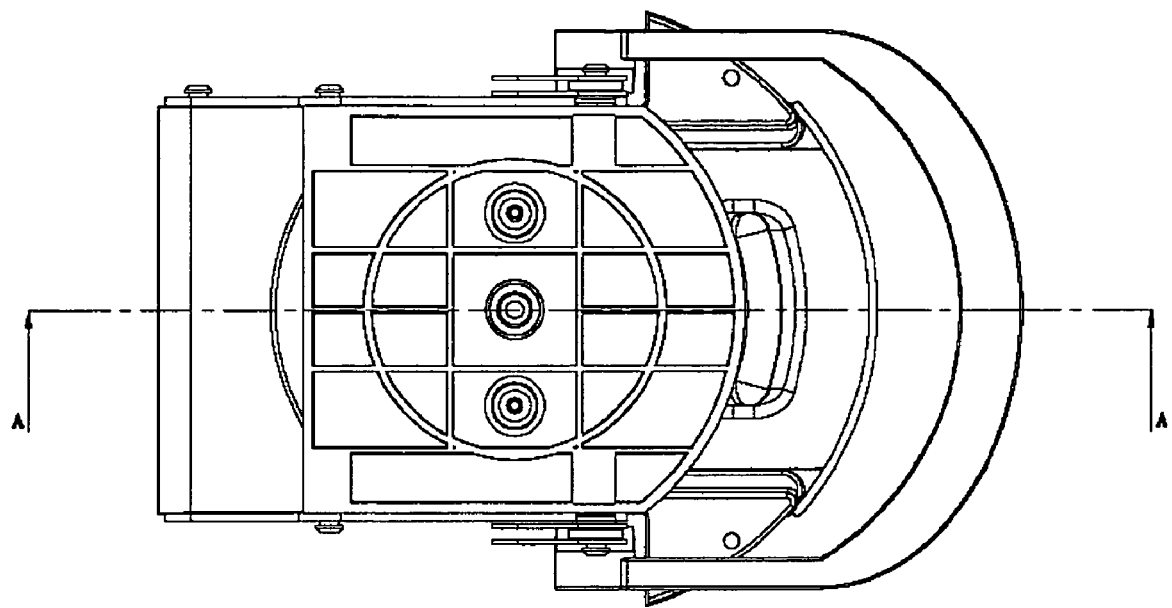
Figure 1B:
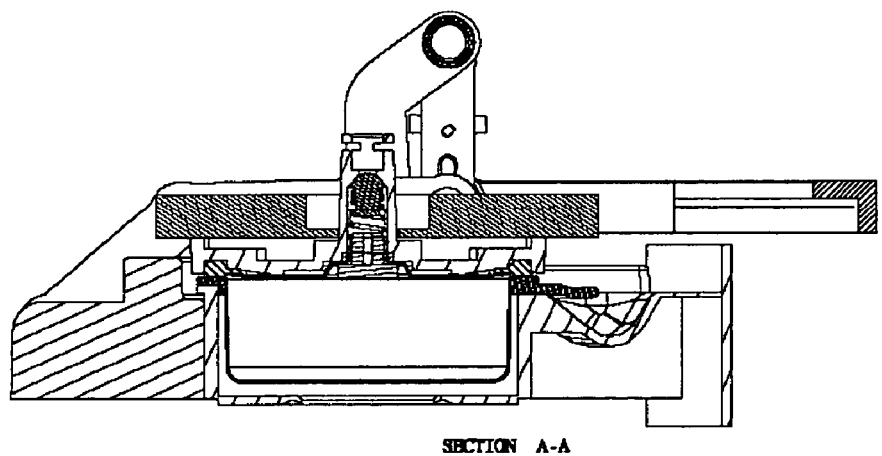
Figure 2:
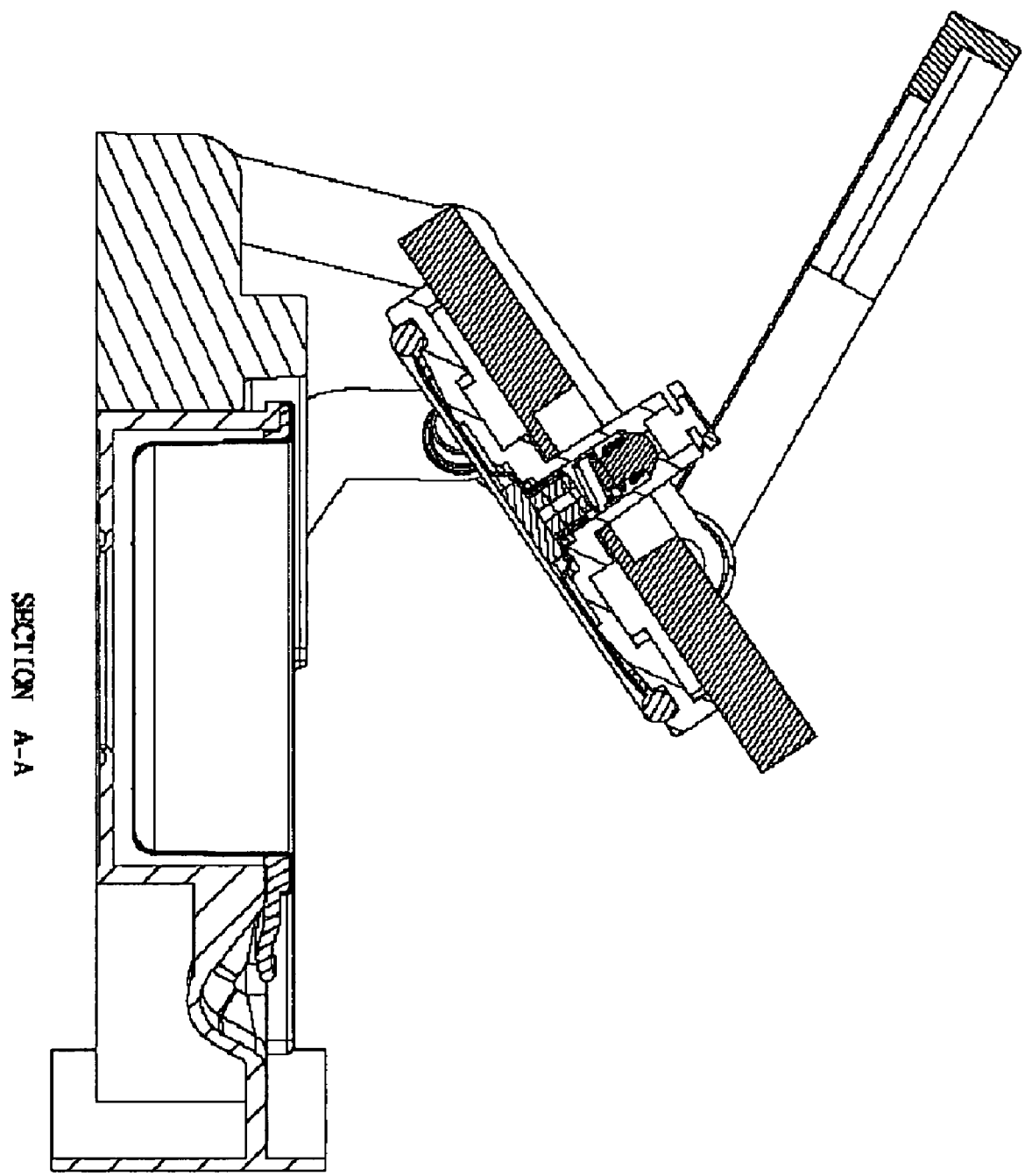
FIG. 2 is a cross-sectional illustration of the brewing head assembly/unit of Construction I in the opened position.
Figure 3:
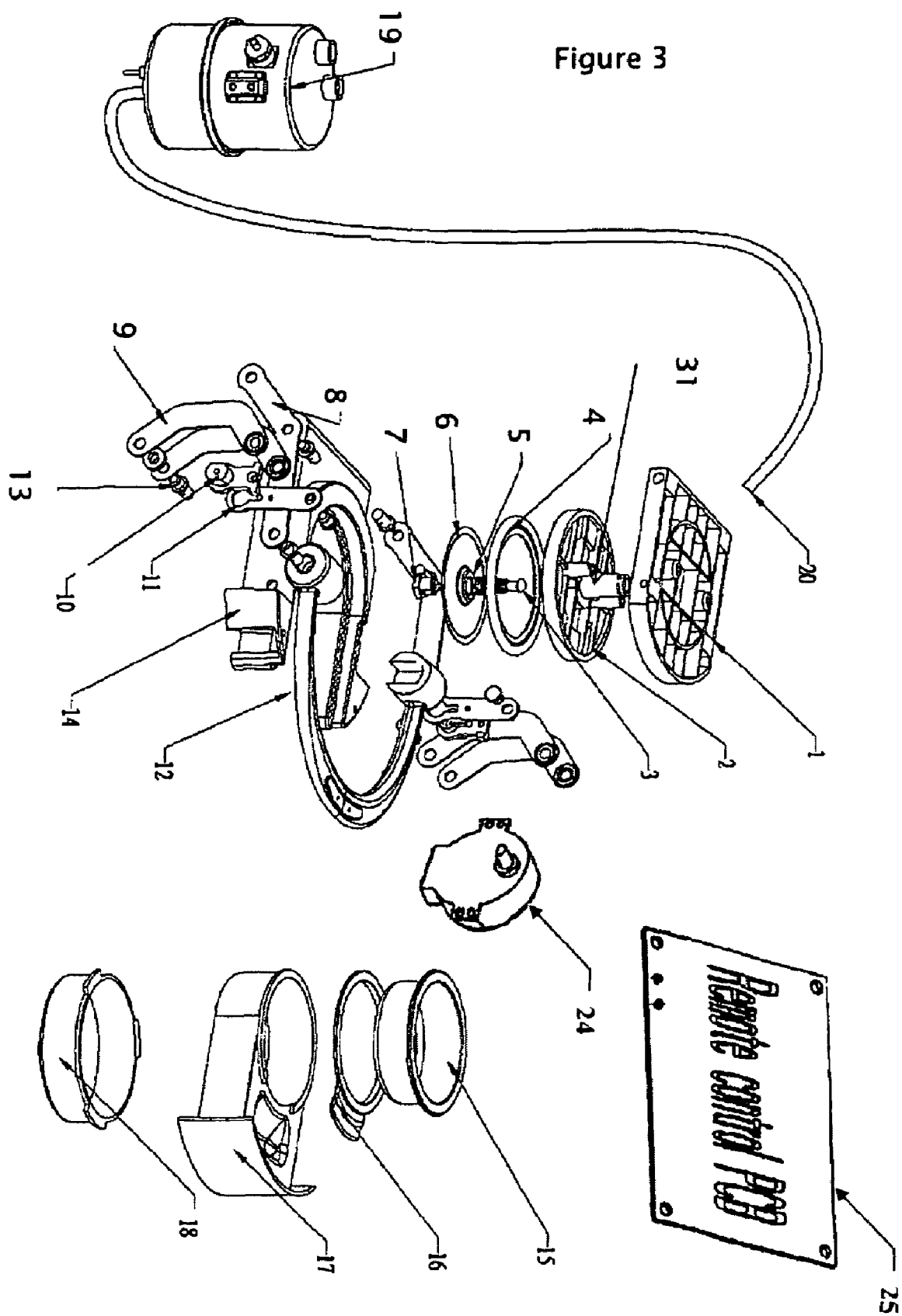
FIG. 3 is an exploded view of the brewing head assembly/unit of Construction I, comprising a rotate-to-lock assembly, motor, remote control PCB, a sealing assembly, a slide filter holder assembly, a separate boiler and hose for delivering pressurized and/or heated water/steam from the boiler to the coffee chamber.
Figure 4:
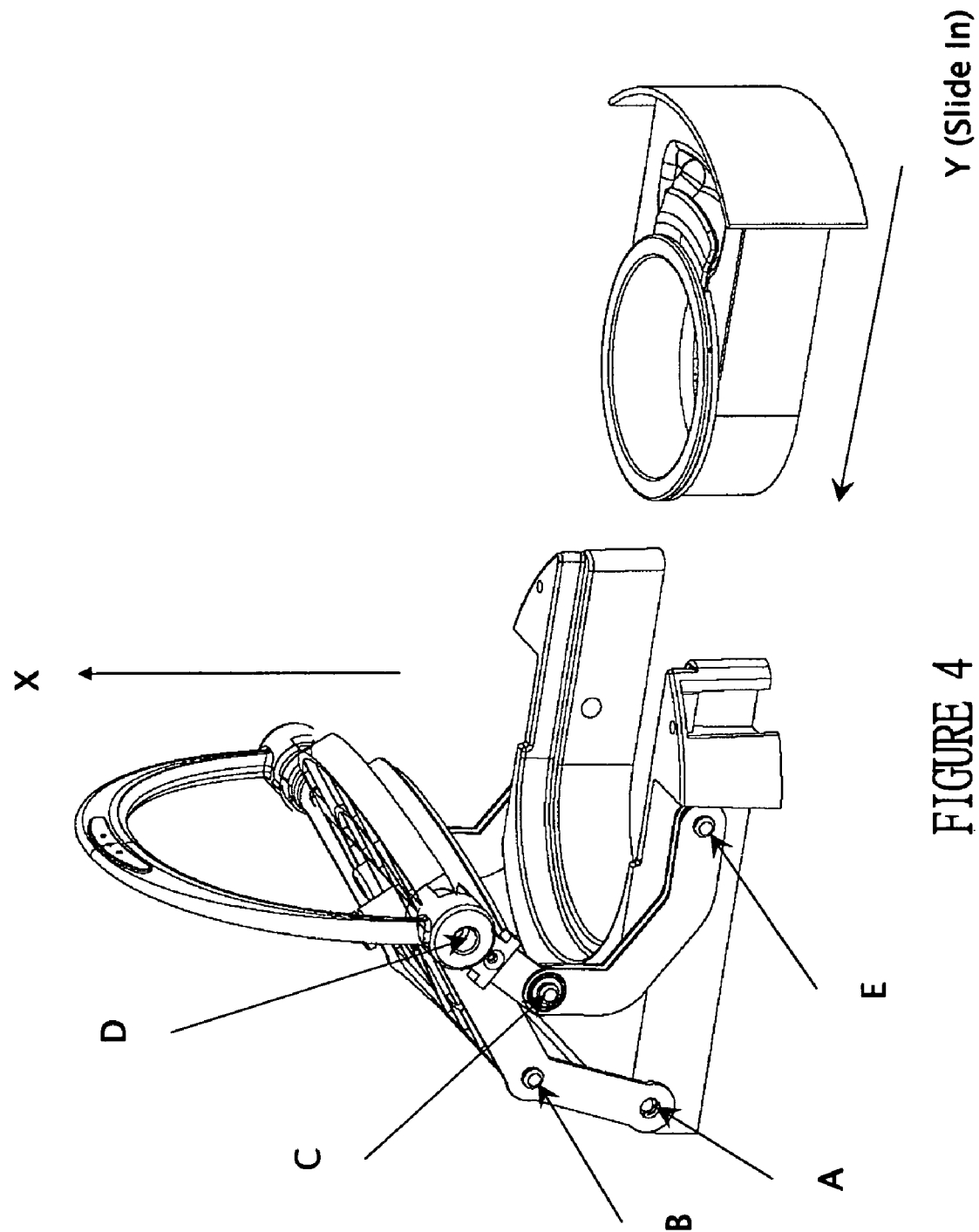
FIG. 4 is an isometric view of the brewing head assembly/unit of Construction I in the opened position.

This embodiment of the present invention provides a rotate-to-lock assembly comprising handle 12 movably-joined to a rotate plate 11, a rotate rod 10, and a top frame 1 by a fixed pin 13, at a position as indicated by arrow D in FIG. 4. A back connection plate 8 is fixed on one end to the top frame, at the positions as indicated by arrows B and D in FIG. 4, and movably-joined to a support base 14 on the other end, at a position as indicated by arrow A in FIG. 4. A front connection plate 9 is moveably-joined to the rotate plate on one end, at a position as indicated by arrow C in FIG. 4, and to the support base 14 on the other end, at a position as indicated by arrow E in FIG. 4. In this embodiment, the rotate-to-lock assembly is as shown in FIG. 3.

This invention provides a sealing assembly comprising a seal ring 4, which is inserted between a water connection plate 2 and a water spreader 6. A water outlet valve 3, which contains a water outlet spring 5, is inserted through the center of the water spreader 6, seal ring 4, and the water connection plate 2. The water outlet valve 3, the water outlet spring 5, the seal ring 4, the water spreader 6 are fixedly attached to the water-connection plate 2 by a water outlet valve holder 7. The water connection plate is fixedly attached to the top frame. The water connection plate 2 contains an opening 31 for connecting the water connection plate 2 to a hose 20 for delivering heated and/or pressurized fluid from a boiler 19 through the sealing assembly to the brewing chamber. In one embodiment, the sealing assembly is as shown in FIG. 3.

This invention provides a filter holder assembly/unit comprising a filter 15, filter handle 16, filter holder 17 and coffee chamber 18. In one embodiment, the filter holder assembly is as shown in FIG. 3.

The operation of the locking mechanism of an embodiment of the present invention, i.e., Construction I, is as follows:

To prevent the leakage of water, the silicone rubber seal ring is used on the brew head to form a water-and/or pressure-tight connection between the water connection plate 2 and the filter 15. The silicone rubber seal ring 4 is fixed between the water connection plate 2 and water spreader 6 by the water outlet valve holder 7.

To unlock the cabinet filter holder 17, the handle 12 is rotated upward in the direction of arrow X, shown in FIG. 4, causing the rotate rod 10 and the rotate plate 11, which are operatively-linked, to move from the upright position backwards to an inclined position. The opening angle of the brew head is about 45 to 55 degrees. After opening the brewing head assembly or unit, the filter holder can be slid into the support base 14 in the direction of arrow Y, or pulled out of the support base 14. The opening/unlocking action in one embodiment is illustrated in FIG. 4.

Figure 5:
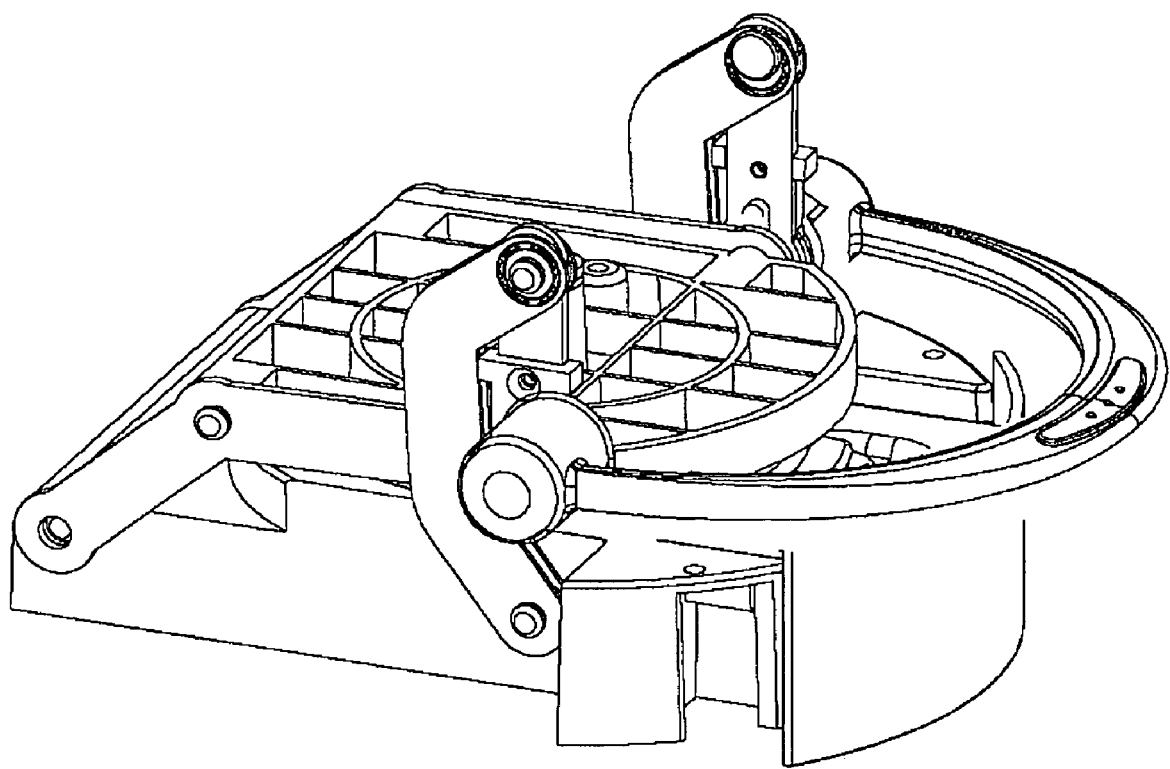
FIG. 5 is an isometric view of the brewing head assembly/unit of Construction I in the locked/closed position.

To close and/or lock the brewing head assembly or unit, the handle is moved downward. The rotate rod 10, rotate plate 11, and front connection plate 9 move upright, and the brew head is locked. Once locked, the silicone rubber seal ring 4 sits on the filter 15. The water connection plate 2 in the locked position will make the seal ring 4 deform on the filter 15. This deformation creates a seal to prevent water from leaking from the flange of the filter 15. The upright position of the rotate plate 11, rotate rod 10, and the front connection plate 9 can sustain up to 20 bars of pressure exerted on the filter 15 without leaking. The closing/locking action in one embodiment is illustrated in FIG. 5. Once in the closed position, the coffee machine can start to brew coffee.

As shown in FIGS. 3 and 4, the metal handle 12 rotates upward for unlocking the brewing head assembly/unit. The handle is linked to the rotate plate 11, rotate rod 10, front connection plate 9, and the back connection plate 8 by a fixed pin 13. All the parts move until the front connection plate is in the horizontal position. The top frame 1 will make an inclination angle of between about 45 to 55 degrees to the support base 14 when the brewing head unit is in the opened position.

The sealing assembly comprises a top frame 1, a water connection plate 2, a seal ring 4, a water outlet valve 3, a water outlet spring 5, a water spreader 6, and a water outlet valve holder 7. The water outlet valve holder 7 is the nut which holds the water spreader 6, water outlet spring 5, seal ring 4, and the water outlet valve 3 to the water connection plate 2. Additionally, the sealing assembly is fixed to the top frame 1 by at least one screw.

The water outlet valve 3 and water outlet spring 5 is used to prevent water or fluid from prematurely flowing out from the water spreader, to the coffee under low pressure during the water heating stage. Hot water is eventually released when the pump pressure is greater than the force being exerted by the water outlet spring, which is around at least 5 bars. When hot water makes contact with the coffee, the pump pressure will increase to at least 10 to 20 bars. At this point, the coffee will then flow out through the coffee chamber 18 into the user's cup.

To brew coffee, the filter holder assembly/unit needs to slide into the brewing head unit. The filter holder assembly/unit is comprised of the metal filter 15, filter handle 16, filter holder 17, and coffee chamber 18. The coffee is placed into the filter, and then the filter holder is inserted into the filter holder. The coffee chamber 18 collects the coffee which then flows to the user's cup.

In a further embodiment, the movement of the filter holder assembly/unit is motorized such that the opening and closing actions can be effectuated by a motor and remote control. In such an embodiment, a motor 24 is connected to the rotate rod 10 and the handle 12 with an adaptor (not shown in the Figure). The motor 24 is controlled by a printed circuit board (PCB) 25, which may be mounted inside the coffee machine using suitable mounting means, such as a screw and plastic support combination. The motor 24 is connected to the PCB 25 with lead wires (not shown in the Figure), which transfer electricity to the motor. In addition to containing electronic components which control the motor, the PCB 25 has an infrared sensor for detecting infrared signals transmitted by the remote control. A standard infrared remote control may be used to transmit such a signal. The user can use the remote control to signal the motor 24 to rotate the handle 12 upwards for unlocking or downwards for locking.

In addition to the gears described above, belts and pulleys may also be connected to the cabinet filter holder unit and the motor so as to facilitate the movement of the cabinet filter holder.

II. Rotate-to-Lock Assembly Construction II

This embodiment of the present invention provides a brewing head assembly/unit, shown in FIGS. 6-10, of a coffee maker comprising: a rotate-to-lock assembly, a sealing assembly, and filter holder assembly, operatively-linked to sustain pressure of at least 5 bars. In one embodiment, the above-described rotate-to-lock assembly, sealing assembly, and filter holder assembly are operatively-linked and capable of advantageously sustaining at least 10 bars of pressure. In another embodiment, the above-described rotate-to-lock assembly, sealing assembly, and filter holder assembly are operatively-linked and capable of advantageously sustaining at least 15 bars of pressure. In a further embodiment, the above-described rotate-to-lock assembly, sealing assembly, and filter holder assembly are operatively-linked and capable of advantageously sustaining up to 20 bars of pressure.

The present invention provides a rotate-to-lock assembly, comprising a handle, a top frame, a connecting plate, a hinge pin, a cam pin, and a support base. In one embodiment, the rotate-to-lock assembly is as shown in FIG. 8.

The present invention additionally provides a sealing assembly, comprising a seal ring, a water connection plate, a water outlet valve, a water outlet spring, a water spreader, and a water outlet valve holder. A boiler 8.17 is connected to the water connection plate by a teflon hose 8.18. In one embodiment, the sealing assembly is as shown in FIG. 8.

The present invention further provides a filter holder assembly/unit, comprising a filter, a filter handle, a filter holder, and a coffee chamber. In one embodiment, the filter holder assembly/unit is as shown in FIG. 8.

The operation of the locking mechanism of an embodiment of the present invention, i.e., Construction II, is as follows:

To prevent the leakage of water from the brewing head, a silicone rubber seal ring 4 is used on the brewing head unit. The silicone rubber seal 4 is fixed between a water connection plate 2 and a water spreader 6 by a water outlet valve holder 7. See FIG. 8.

To operate the rotate-to-lock assembly, a handle 12 is rotated upwards in the direction of arrow W until the handle 12 is about 90 degrees with the horizontal. See FIGS. 8 and 9. A cam pin 8.11 is linked to the handle 12, at a position as indicated by arrow H in FIG. 9. When the cam pin 8.11 rotates, it causes the connection plate 8.3 to rise up in the direction of arrow U, shown in FIG. 9. The connection plate 8.3 is linked to the top frame 8.1 by two hinge pins 8.2 (on both sides) at the positions as indicated by arrows I and K. Additionally, a hinge pin 8.2 (on both sides) is used to fix the connection plate 8.3 to the support base 8.12, at the position indicated by arrow J. The clamp force on the filter holder 17 is released by lifting the connection plate 8.3 with the cam pin 8.11 and handle 12. Once the brewing head assembly/unit is in the opened position, the user can insert or slide-in the filter holder assembly/unit in the direction of arrow V, or pull out the filter holder assembly/unit. See FIG. 9.

To brew coffee, the filter holder assembly/unit is first inserted into the cabinet filter holder housing located on the support base 8.12 of the brewing head assembly/unit. The handle 12 is then rotated downward to the locked/closed position (See FIG. 10) causing the cam pin 8.11 to force the connection plate 8.3 downward. The connection plate 8.3 and cam pin 8.11 configuration will create a clamp force capable of maintaining an air- and/or water-tight seal up to 20 bars against the filter holder assembly. The filter holder is sealed by a seal ring 4 and the clamp force created by the cam pin 8.11 and the connection plate 8.3.

FIG. 8 is an exploded view of the brewing head assembly/unit of Construction II showing the components of the rotate-to-lock assembly, the sealing assembly, and the filter holder assembly.

As shown in FIGS. 8 and 9, the metal handle 12 rotates upward to unlock the brewing head unit. The handle is linked to cam pin 8.11 and the connection plate 8.3 by a screw. When the handle moves, the cam pin 8.11 will rotate. The irregular shape of the cam pin will cause the connection plate 8.3 to rise up because the connection plate 8.3 is connected to the top frame 8.1 by the hinge pin 8.2 on both sides. The connection plate will also cause the top frame 8.1 to rise up slightly. When open, the inclination angle between the top frame 8.1 and the support base 8.12 is about 10 degrees. This angle is just enough for the filter holder assembly/unit to slide in and out of the brewing head unit. After the filter holder assembly/unit is inserted into the brewing head unit, the handle can be rotated downward to lock the filter holder assembly/unit.

The sealing assembly of the brew head assembly/unit of Construction II comprises a top frame 8.1, a water connection plate 2, a seal ring 4, a water outlet valve 3, a water outlet spring 5, a water spreader 6, and a water outlet valve holder 7. The water outlet valve holder 7 is the nut which holds the water spreader 6, water outlet spring 5, seal ring 4, and water outlet valve 3 to the water connection plate 2. The sealing assembly is fixed to the top frame 8.1 by one or more screws.

Water outlet valve 3 and water outlet spring 5 is used to prevent premature water leakage from the water spreader 6 under low pressure during the water heating stage. Hot water is eventually released when the pump pressure is greater than the force exerted by the water outlet spring 5, which is around 5 bars. When the hot water makes contact with the coffee, the pump pressure will increase to at least 10 to 20 bars. The coffee will then flow out through coffee chamber 18 into the user's cup.

To brew coffee, the user needs to slide the filter holder assembly/unit into the brewing head assembly/unit. The filter holder assembly/unit comprises a filter 15, filter handle 16, filter holder 17, and coffee chamber 18. The coffee is placed on the filter 15, and then the filter 15 is inserted into the filter holder 17. The coffee chamber 18 collects and releases the brewed coffee.

In a further embodiment, a motor 24 is connected to the cam pin 8.11 and the handle 12 with an adaptor (not shown in the Figure). The motor is controlled by a PCB 25. The PCB 25 has an infrared sensor for detecting infrared signals transmitted by the remote control. As discussed in the corresponding section of Construction I, the user can use the remote control to signal the motor 24 to rotate the handle 12 upwards for unlocking or downwards for locking.

In addition to the gears described above, belts and pulleys may also be connected to the cabinet filter holder unit and the motor so as to facilitate the movement of the cabinet filter holder.

III. Rotate-to-Lock Assembly of Construction III

This embodiment of the present invention provides a brewing head assembly/unit, as illustrated in FIGS. 11-16, of a coffee maker comprising: a rotate-to-lock assembly, a sealing assembly, and a filter holder assembly/unit, operatively-linked to sustain pressure of at least 5 bars. In another embodiment, the above-described rotate-to-lock assembly, sealing assembly, and filter holder assembly/unit, are operatively-linked to sustain pressures of at least 10 bars. In an additional embodiment, the above-described rotate-to-lock assembly, sealing assembly, and filter holder assembly/unit, are operatively-linked to sustain pressures of at least 15 bars. In a further embodiment, the above-described rotate-to-lock assembly, sealing assembly, and filter holder assembly/unit, are operatively-linked to sustain pressures up to 20 bars.

The present invention provides a rotate-to-lock assembly, comprising a handle 12, rotation pole 13.20 having a protruding member 20A, moving rod 22, support base 13.17 having two protruding members 17A, copper shaft 23, slider plate 13.1 having upper protruding member 1A and lower protruding member 1B, slider plate holder 13.15, shower head 13.4, and bushings 13.3. The handle 12 and the rotation pole 13.20 are moveably-joined to the protruding member 17A of the support base 13.17, at a position indicated by arrow A in FIG. 14. One end of the moving rod 22 is moveably-joined to the protruding member 20A of the rotation pole 13.20 by a copper shaft 23, at a position indicated by arrow B in FIG. 14, and the other end of the moving rod 22 is movably-joined to the upper protruding member 1A of the slider plate 13.1, at a position indicated by arrow C in FIG. 15. The slider plate 13.1 is guided by the slider plate holder 13.15 with the bushings 13.3, which are moveably-joined to the upper and lower protruding member 1A and 1B, respectively, at a position indicated by arrow D in FIG. 14. The slider plate holder 13.15 is attached to the support base 13.17. The shower head 13.4 is attached to the bottom of the slider plate 13.1. In one embodiment, the rotate-to-lock assembly is as shown in FIG. 13.

The present invention provides a sealing assembly comprising a seal ring 13.24, which is installed onto the shower head 13.4. A water spreader 6 is fixedly-attached to shower head 13.4 by spreader holder 13.6. In one embodiment, the seal ring is fabricated from silicon rubber, or elastomeric or other suitable material capable of providing a water-tight and/or air-tight seal under pressure and/or elevated temperature. Suitable materials which can be used to fabricate the seal ring are readily determinable by one of ordinary skill in the art. In one embodiment, the sealing assembly is as shown in FIG. 13.

This invention provides a filter holder assembly/unit, comprising a filter 13.7, filter basket 13.8, and filter handle 13.10. In one embodiment, the filter is fabricated from metal, plastic, or other suitable material. Suitable materials which can be used to fabricate the filter are readily determinable by one of ordinary skill in the art. In one embodiment, the filter holder assembly/unit is as shown in FIG. 13.

The operation of the locking mechanism of an embodiment of the present invention, i.e., Construction III, is as follows:

To prevent the leakage of the water from the brewing head, a silicone rubber seal ring 13.24 is used on the brewing head assembly/unit. The silicone rubber sealing ring 13.24 is fixed onto the shower head 13.4. See FIG. 13.

To operate the rotate-to-lock assembly, a handle 12 is rotated upwards in the direction of arrow E, as shown in FIG. 14, until the metal handle 12 is approximate 100 degrees with the horizontal. See FIG. 14. A rotation pole 13.20 is moveably-linked to each side of the handle 12 at a position as indicated by arrow A in FIG. 14. When the rotation pole 13.20 rotates, it causes the moving rod 22 to swing up in the direction of arrow F, as shown in FIG. 14. The upward movement of the moving rod 22 causes the slider plate 13.1 to move upward, as indicated by arrow G in FIG. 14. The shower head 13.4, which is attached to the bottom of the slider plate 13.1, also moves upward with the slider plate 13.1. See FIG. 14. The clamp force on the filter holder 13.11 is released by lifting the shower head 13.4 with the rotation pole 13.20 and the handle 12. Once the brewing head assembly/unit is in the opened position, the user can insert or slide-in the cabinet filter holder assembly/unit in the direction of arrow H, as shown in FIG. 14, or pull out the filter holder assembly/unit. See FIG. 14.

To brew coffee, the cabinet filter holder 13.11 is inserted into the support base 13.17 of the filter holder assembly/unit. The cabinet filter holder 13.11 is supported by a filter holder support plate 13.18 attached to the bottom of the support base 13.17. The cabinet filter holder 13.11 can also be supported by guides located on either side of the cabinet filter holder 13.11, i.e., see 11A, and corresponding recesses or protrusions located on the support base 13.17. The handle 12 is then rotated downward in the direction of arrow K, as shown in FIG. 15, until the handle is about 0 degrees or about parallel with the horizontal, to the locked or closed position. The rotation pole 13.20 has a stopper 20B to make the moving rod 22 stop at a pre-selected position, for example to stop or hold the handle 12 at about parallel to the horizontal. See FIGS. 15 and 16. The downward movement of the handle 12 causes the rotation pole 13.20 and the moving rod 22 to swing or move downward, causing the slider plate and the sealing assembly/unit to also move downward into the filter basket 13.8. See FIG. 15. Once the sealing assembly/unit is lowered on to the filter basket 13.8, the compression force exerted on the sealing ring 13.24 by the shower head 13.4 through the rotate-to-lock assembly on the filter basket 13.8 will form a water- and/or air-tight seal between the filter basket 13.8 and the shower head 13.4. In one embodiment, the sealing ring can provide an effective seal involving pressures up to 20 bars. During the brewing cycle, the hot water and/or steam is released from the boiler 13.19 and/or heating system when the pump is turned on. The steam and/or hot water are delivered to the area between the shower head 13.4 and the filter basket 13.8 by a suitable tube. The pressure, i.e., from the pump, will make the shower head move upward in the direction of arrow L, as shown in FIG. 16B, which also causes the moving rod swing upward in the direction of arrow M, as shown in FIG. 16B. The stopper 20B, as shown in FIG. 16B, on the rotation pole will prevent the moving rod 22 from swinging upward completely. The stopper 20B ensures that the inter-locking force on the shower head 13.4 is maintained so that the sealing assembly/unit will remain locked.

To brew coffee, the user needs to slide the filter holder assembly/unit into the brewing head assembly/unit. The filter holder assembly/unit comprises a filter 13.7, filter basket 13.8, filter handle 13.10, foam system 13.9, and cabinet filter holder 13.11. The coffee is placed on the filter basket 13.8, and the filter is then inserted into the cabinet filter holder 13.11. The filter holder collects and releases the brewed coffee.

In a further embodiment, a motor 24 is connected to the rotation pole 13.20 and the handle 12 with a adaptor (not shown in the Figure). The motor is controlled by a PCB 25. The PCB 25 has an infrared sensor for detecting infrared signals transmitted by the remote control. As discussed in the corresponding sections of Construction I and II, the user can use the remote control to signal the motor 24 to rotate the handle 12 upwards for unlocking or downwards for locking.

In addition to the gears described above, belts and pulleys may also be connected to the cabinet filter holder unit and the motor so as to facilitate the movement of the cabinet filter holder.

We claim:

1. A brewing head of a coffee machine, comprising:
   (a) a rotate-to-lock assembly, which comprises a handle having two ends, wherein each end of said handle is movably-joined to one end of a rotate plate, rotate rod, and top frame by a fixed pin; wherein a portion of a back connection plate is fixedly-attached to the side of said top frame and the other portion of said back connection plate is movably-joined to a support base; wherein one end of a front connection plate is movably-joined to the other end of said rotate plate, and the other end of said front connection plate is movably-joined to said support base; and wherein a motor is connected to the rotate rod and handle, and wherein a remote control printed control board is connected to the motor;
   (b) a filter holder assembly, which comprises a filter, filter handle, filter holder, and coffee chamber; wherein the filter contains a flange; and
   (c) a sealing assembly, which comprises a seal ring, inserted between a water connection plate and a water spreader; wherein a water outlet valve, water outlet spring, said seal ring, and said water spreader are fixedly attached to the water connection plate by a water outlet valve holder; wherein the water connection plate is fixedly attached to the top frame; wherein the water connection plate contains an opening for connecting the water connection plate to a hose for delivering heated and/or pressurized fluid from a boiler, in the closed position, the handle is rotated downward to move the front connection plate to a vertical position; wherein the seal ring forms an air- and water-tight seal with the flange of the filter; wherein the rotate-to-lock assembly, the filter holder assembly, and the sealing assembly are operatively-linked to sustain pressures up to twenty bars.

2. The brewing head according claim 1, wherein the filter holder assembly comprises a flange to provide linear sliding movement of the cabinet filter holder relative to the brewing head.

3. The brewing head according to claim 1, additionally comprising means connected to the motor for enabling the motor to be operated remotely.

4. The brewing head of claim 1, further comprising means for producing and delivering hot fluid to the brewing head.

5. A brewing head of a coffee machine, comprising:
(a) a rotate-to-lock assembly, which comprises a handle having two ends; wherein each end of the handle is movably joined to a cam pin and a top frame; wherein each cam pin rotates a back connection plate; wherein one member of each back connection plate is fixably attached to each side of the top frame by hinge pins and movably joined to each of the cam pins; wherein the other member of each back connection plate is pivotally joined to a support base; and wherein a motor is connected to the cam pin and handle, and wherein a remote control printed control board is connected to the motor;
(b) a filter holder assembly, which comprises a filter, a filter handle, a filter holder, and a coffee chamber; wherein the filter contains a flange; and
(c) a sealing assembly, which comprises a seal ring, inserted between a water connection plate and a water spreader; wherein a water outlet valve, a water outlet spring, the seal ring, the water spreader are fixedly attached to the water connection plate by a water outlet valve holder; wherein the water connection plate is fixedly attached to the top frame; wherein the water connection plate contains an opening for connecting the water connection plate to a hose for delivering heated and/or pressurized fluid from a boiler,
in the closed position, the handle is rotated downward to lower the connection plate; wherein the seal ring forms a pressure- and/or water-tight seal with the flange of the filter; wherein the rotate-to-lock assembly, the filter holder assembly and the sealing assembly are operatively linked to sustain pressure up to twenty bars.

6. The brewing head according claim 5, wherein the filter holder assembly comprises a flange to provide sliding movement of the cabinet filter holder assembly relative to the brewing head.

7. The brewing head according to claim 6, additionally comprising means connected to the motor for enabling the sliding movement of the cabinet filter holder to be operated remotely.

8. The brewing head according to claim 5, additionally comprising means connected to the motor for enabling the motor to be operated remotely.

9. The brewing head of claim 5, further comprising a means for producing and delivering hot fluid to the brewing head unit.

10. A brewing head of a coffee machine, comprising:
(a) a rotate-to-lock assembly, which comprises a handle having two ends, wherein each end of the handle is joined to a rotation pole having a protruding member, wherein each rotation pole is movably attached to a protruding member of a support base, wherein the protruding member is movably joined to one end of a moving rod, wherein the other end of the moving rod is movably joined to a upper protruding member of a slider plate, wherein the movement of the slider plate is guided by the slider plate holder attached the support base; wherein a shower head is attached to the bottom of the slider plate; and wherein a motor is connected to the rotation pole and handle, and wherein a remote control printed control board is connected to the motor;
(b) a filter holder assembly, which comprises a filter, a filter basket, a filter handle, a filter holder and a coffee chamber; wherein the filter contains a flange; and
(c) a sealing assembly, which comprises a seal ring fixed on the shower head; wherein a water spreader is attached to the shower head by a spreader holder; wherein the pressurized or heated fluid and/or steam from the boiler is delivered to the shower head by a tube or pipe, in the closed position, the handle is rotated downward to move the rotation pole, which causes the moving rod to swing or move downward; wherein the slider plate which is attached to one end of the moving rod lowers the shower head onto the filter basket; wherein the seal ring on the shower head forms a water- and pressure-tight seal, capable of sustaining pressures up to 20 bars.

11. The brewing head according to claim 10, wherein the filter holder assembly further comprises a foam system for producing foam coffee or coffee with froth.

12. The brewing head according to claim 11, wherein the foam system is attached to the bottom of the filter basket.

13. The brewing head according to claim 10, wherein the rotate-to-lock assembly further comprises a stopper attached to at least one protruding member of the support base.

14. The brewing head according to claim 10, wherein the motor for opening and closing the rotate-to-lock assembly is operated by a remote control.

15. The brewing head of claim 10, further comprising means for producing and delivering hot fluid to the brewing head.

* * * * *